US008489396B2

(12) United States Patent
Hetherington et al.

(10) Patent No.: US 8,489,396 B2
(45) Date of Patent: Jul. 16, 2013

(54) NOISE REDUCTION WITH INTEGRATED TONAL NOISE REDUCTION

(75) Inventors: Phil A. Hetherington, Port Moody (CA); Xueman Li, Burnaby (CA)

(73) Assignee: QNX Software Systems Limited, Kanata, Ontario (CA)

( * ) Notice: Subject to any disclaimer, the term of this patent is extended or adjusted under 35 U.S.C. 154(b) by 1111 days.

(21) Appl. No.: 11/961,715

(22) Filed: Dec. 20, 2007

(65) Prior Publication Data

US 2008/0167870 A1 Jul. 10, 2008

Related U.S. Application Data

(60) Provisional application No. 60/951,922, filed on Jul. 25, 2007.

(51) Int. Cl.
*G10L 15/20* (2006.01)
*G10L 21/02* (2006.01)

(52) U.S. Cl.
USPC ............................ 704/233; 704/234; 704/226

(58) Field of Classification Search
USPC .......................................... 704/226, 233, 234
See application file for complete search history.

(56) References Cited

U.S. PATENT DOCUMENTS

| | | | | |
|---|---|---|---|---|
| 5,228,088 | A * | 7/1993 | Kane et al. | 704/233 |
| 5,485,522 | A * | 1/1996 | Solve et al. | 381/56 |
| 5,706,395 | A | 1/1998 | Arslan et al. | |
| 5,826,230 | A * | 10/1998 | Reaves | 704/233 |
| 5,950,154 | A * | 9/1999 | Medaugh et al. | 704/226 |
| 6,111,183 | A * | 8/2000 | Lindemann | 84/633 |
| 6,415,253 | B1 * | 7/2002 | Johnson | 704/210 |
| 6,519,559 | B1 * | 2/2003 | Sirivara | 704/227 |
| 6,674,865 | B1 * | 1/2004 | Venkatesh et al. | 381/107 |

(Continued)

FOREIGN PATENT DOCUMENTS

| | | | |
|---|---|---|---|
| DE | 001796078 A * | 12/2005 | |
| EP | 1 703 494 A1 | 9/2006 | |
| WO | WO 2006/122388 A1 | 11/2006 | |

OTHER PUBLICATIONS

R. Martin, "Noise power spectral density estimation based on optimal smoothing and minimum statistics", IEEE Trans. Speech and Audio Processing, vol. 9, No. 5, pp. 504-512, Jul. 2001.*

(Continued)

*Primary Examiner* — Pierre-Louis Desir
*Assistant Examiner* — Abdelali Serrou
(74) *Attorney, Agent, or Firm* — Brinks Hofer Gilson & Lione

(57) ABSTRACT

The system provides a technique for suppressing or eliminating tonal noise in and input signal. The system operates on the input signal at a plurality of frequency bins and uses information generated at a prior bin to assist in calculating values at subsequent bins. The system first identifies peaks in a signal and then determines if the peaks are from tonal effects. This can be done by comparing the estimated background noise of a current bin to the smoothed background noise of the same bin. The smoothed background noise can be calculated using an asymmetric IIR filter. When the ratio of the current background noise estimate to the currently calculated smoothed background noise is far greater than 1, tonal noise is assumed. When tonal noise is found, a number of suppression techniques can be applied to reduce the tonal noise, including gain suppression with fixed floor factor, an adaptive floor factor gain suppression technique, and a random phase technique.

19 Claims, 6 Drawing Sheets

U.S. PATENT DOCUMENTS

| | | | | |
|---|---|---|---|---|
| 7,058,572 | B1 * | 6/2006 | Nemer | 704/226 |
| 7,191,122 | B1 * | 3/2007 | Gao et al. | 704/223 |
| 7,231,347 | B2 * | 6/2007 | Zakarauskas | 704/233 |
| 7,272,234 | B2 * | 9/2007 | Sommerfeldt et al. | 381/71.11 |
| 7,783,481 | B2 * | 8/2010 | Endo et al. | 704/226 |
| 7,912,567 | B2 * | 3/2011 | Chhatwal et al. | 700/94 |
| 7,917,356 | B2 * | 3/2011 | Chen et al. | 704/214 |
| 7,970,121 | B2 * | 6/2011 | Li | 379/387.01 |
| 2004/0133424 | A1 * | 7/2004 | Ealey et al. | 704/233 |
| 2005/0091049 | A1 * | 4/2005 | Yang et al. | 704/226 |
| 2005/0182624 | A1 * | 8/2005 | Wu et al. | 704/233 |
| 2005/0203736 | A1 * | 9/2005 | Yasunaga et al. | 704/226 |
| 2005/0288923 | A1 * | 12/2005 | Kok | 704/226 |
| 2006/0018457 | A1 * | 1/2006 | Unno et al. | 379/388.04 |
| 2006/0136199 | A1 * | 6/2006 | Nongpiur et al. | 704/207 |
| 2006/0215840 | A1 * | 9/2006 | Suganuma | 381/13 |
| 2006/0265215 | A1 * | 11/2006 | Hetherington et al. | 704/226 |
| 2007/0055507 | A1 * | 3/2007 | Jin et al. | 704/226 |
| 2007/0232257 | A1 * | 10/2007 | Otani et al. | 455/403 |

OTHER PUBLICATIONS

Yamato et al., "Post-Processing Noise Suppressor with Adaptive Gain-Flooring for Cell-Phone Handsets and IC Recorders", Consumer Electronics, 2007. ICCE 2007. Digest of Technical Papers. International Conference on Jan. 10-14, 2007, pp. 1-2.*

McAulay et al., "Speech enhancement using a soft-decision noise suppression filter", Acoustics, Speech and Signal Processing, IEEE Transactions on Apr. 1980, vol. 2, pp. 137-145.*

Boll, "Suppression of acoustic noise in speech using spectral subtraction", Acoustics, Speech and Signal Processing, IEEE Transactions on Apr. 1979, vol. 27, pp. 113-120.*

Ephraim et al., "Speech enhancement using a minimum-mean square error short-time spectral amplitude estimator", Acoustics, Speech and Signal Processing, IEEE Transactions on Dec. 1984, vol. 32, version 2003, pp. 1109-1121.*

Wan et al. "Optimal tonal detectors based on the power spectrum", Oceanic Engineering, IEEE Journal of Oct. 2000, vol. 25, pp. 540-552.*

* cited by examiner

NOISE REDUCTION WITH INTEGRATED TONAL NOISE REDUCTION

RELATED APPLICATIONS

This application claims priority to U.S. Provisional Patent Application Ser. No. 60/951,952, entitled “Noise Reduction With Integrated Tonal Noise Reduction,” and filed on Jul. 25, 2007, and is incorporated herein in its entirety by reference.

BACKGROUND OF THE SYSTEM

1. Technical Field

The system is directed to the field of sound processing. More particularly, this system provides a way to remove tonal noise without degrading speech or music.

2. Related Art

Speech enhancement often involves the removal of noise from a speech signal. It has been a challenging topic of research to enhance a speech signal by removing extraneous noise from the signal so that the speech may be recognized by a speech processor or by a listener. Various approaches have been developed over the past decades. Among them the spectral subtraction methods are the most widely used in real-time applications. In this method, an average noise spectrum is estimated and subtracted from the noisy signal spectrum, so that average signal-to-noise ratio (SNR) is improved.

However, prior art speech enhancement techniques do not always work when the noise is of a type referred to as “tonal” noise. Tonal noise can occur in homes, offices, cars, and other environments. An often quoted source of tonal noise in the home and office is the buzzing of fluorescent lights. Another is the hum of a computer or projector fan. In the car tonal noise can result from rumble strips, car engine, alternator whine, radio interference (“GSM buzz”), or a whistle from an open window. This tonal noise can negatively impact phone conversations and speech recognition, making speech a little more difficult to understand or recognize.

A speech processing system which examines an input signal for desired signal content may interpret the tonal noise as speech, may isolate a segment of the input signal with the tonal noise, and may attempt to process the tonal noise. The speech processing system consumes valuable computational resources not only to isolate the segment, but also to process the segment and take action based on the result of the processing. In a speech recognition system, the system may interpret the tonal noise as a voice command, execute the spurious command, and responsively take actions that were never intended.

Tonal noise appears as constant peaks in an acoustic frequency spectrum. By definition the peaks stand out from the broader band noise, often by 6 to 20 dB. Noise reduction typically attenuates all frequencies equally, so the remaining tonal noise is quieter, but is just as distinct after noise reduction as before. Therefore the existing noise removal approach does not really help reduce tonal noise relative to the broader background noise.

SUMMARY

The invention details an improvement to a noise removal system. Quasi-stationary tonal noise appears as peaks in a spectrum of normally broadband or diffuse noise. Noise reduction typically attenuates all frequencies equally, so tonal noise while quieter is just as distinct before noise reduction as after. The system identifies peaks, determines which peaks are likely to be tonal peaks, and applies an adaptive suppression to the tonal peaks. The system uses a technique of tonal noise reduction (TNR) that places greater attenuation at frequencies where tonal noise is found. The TNR system may do additional processing (phase randomization) to virtually eliminate any residual tonal sound. This system is not a simple passive series of notch filters and therefore does not remove speech or music that overlaps in frequencies. Moreover it is adaptive and does not do any additional filtering if tonal noise is not present.

BRIEF DESCRIPTION OF THE DRAWINGS

The invention can be better understood with reference to the following drawings and description. The components in the Figures are not necessarily to scale, emphasis instead being placed upon illustrating the principles of the invention. Moreover, in the Figures, like reference numerals designate corresponding parts throughout the different views.

DETAILED DESCRIPTION OF THE SYSTEM

Figure 1:
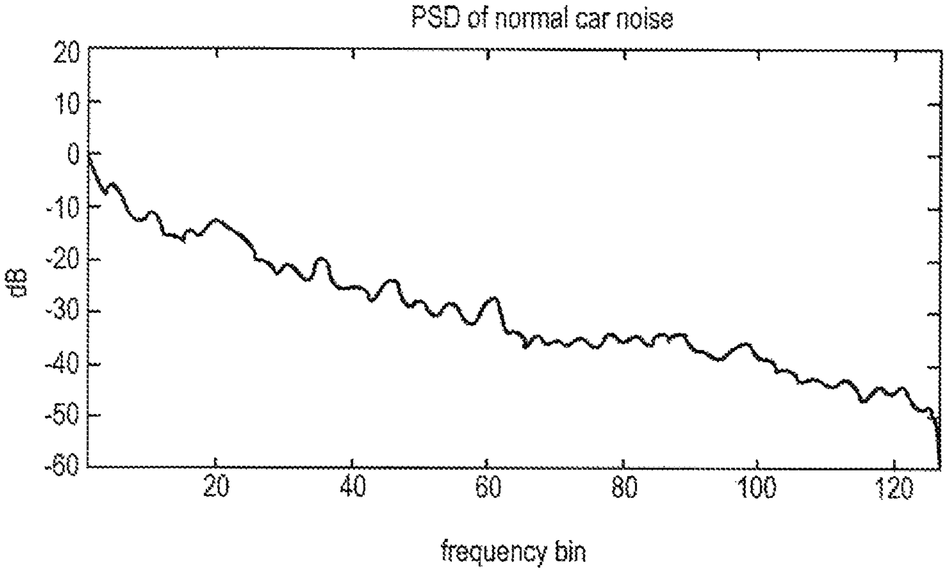
FIG. 1 is a PSD of normal car noise.

A typical frequency domain speech enhancement system usually consists of a spectral suppression gain calculation method, and a background noise power spectral density (PSD) estimation method. While spectral suppression is well understood, PSD noise estimation historically received less attention. However, it has been-found very important to the quality and intelligibility of the overall-system in recent years. Most spectral suppression methods can achieve good quality when background noise is stationary or semi-stationary over time and also smooth across frequencies. When tonal noise is present in the background a conventional spectral suppression method can suppress it, but cannot eliminate the tonal noise. The residual tonal noises are distinctive and can be annoying to the human ear. This system provides principles and techniques to remove the tonal noise completely without degrading speech quality.

Tonal noise reduction (TNR) of the system places greater-attenuation at the peak frequencies to the extent to which the peaks are greater than the diffuse noise. For example, if a peak is seen in a noise estimate that is 10 dB greater than the noise in the surrounding frequencies then an extra 10 dB of noise attenuation is done at that frequency. Thus, the spectral shape after TNR will be smooth across neighboring frequencies and tonal noise is significantly reduced.

At any given frequency the contribution of noise can be considered insignificant when the speech is greater than 12 dB above the noise. Therefore, when the signal is significantly higher than the noise, tonal or otherwise, NR, with or without TNR should not and does not have, any significant impact. Lower SNR signals will be attenuated more heavily around the tonal peaks, and those signals equal to the tonal noise peaks will be attenuated such that the resulting spectrum is flat around the peak frequency (its magnitude is equal to the magnitude of the noise in the neighboring frequencies).

Reducing the power of the tonal noise (while leaving its phase intact) may not completely remove the sound of the tones, because the phase at a given frequency still contributes to the perception of the tone. In one method, if the signal is close to the tonal noise, the phase at that frequency bin may be randomized. This has the benefit of completely removing the tone at that frequency. The system provides improved voice quality, reduced listener fatigue, and improved speech recognition.

Other systems, methods features and advantages of the invention will be, or will, become, apparent to one with skill in the art upon examination of the following figures and detailed description. It is intended that all such additional systems, methods, features and advantages be included within this description, be within the scope of the invention, and be protected by the following claims.

Methods to Detect Tonal Noise

Normal car noise is diffuse noise. Its power density smoothly decays when frequency increases. A spectrogram of normal car noise shows a relatively smooth and somewhat homogeneous distribution throughout the spectrogram. By contrast, tonal noise usually only covers certain frequencies and holds for a relative long period of time. A spectrogram of tonal noise shows a much uneven distribution.

Figure 2:
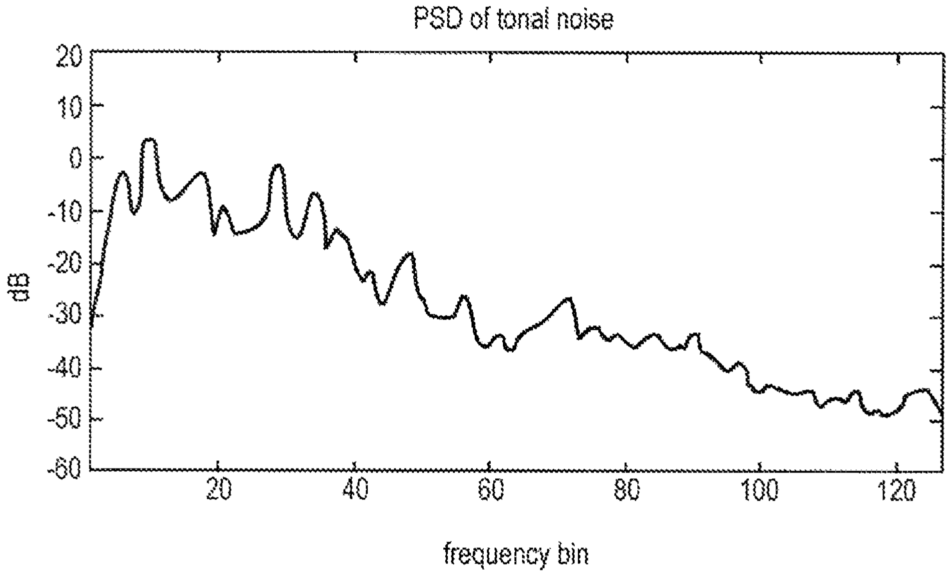
FIG. 2 is a PSD of tonal noise.

A PSD of normal car noise is illustrated in FIG. 1. The graph shows how the power of a signal is distributed with frequency. As can be seen, normal road noise has more power at lower frequencies and has a substantially reduction in power with frequency so that at the higher frequencies, the power of the signal is relatively small. By contrast, the PSD of tonal noise, illustrated in FIG. 2, shows that the power is distributed in a number of peaks at varying frequencies. The PSD of the tonal noise signal of FIG. 2 is much more "peaky" than that of normal road noise.

Most conventional noise tracking algorithms with reasonable frequency resolution can track tonal noise in the background. Tonal noise usually shows in the noise spectrum as peaks standing much above their neighbors as illustrated at a number of frequencies in FIG. 2.

Figure 5:
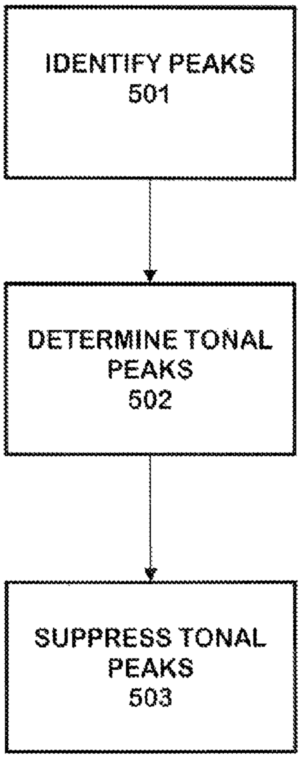
FIG. 5 is a flow diagram illustrating the operation of the system in identifying and suppressing tonal noise.

FIG. 5 is a flow diagram illustrating the operation of the system in identifying and suppressing tonal noise. At step 501 the system identifies the peaks of a background noise spectrum. At step 502 the tonal peaks that are to be suppressed are identified. At step 503, the tonal peaks are suppressed so that their impact on the signal is reduced.

Tonal Noise Peak Detection

Figure 6:
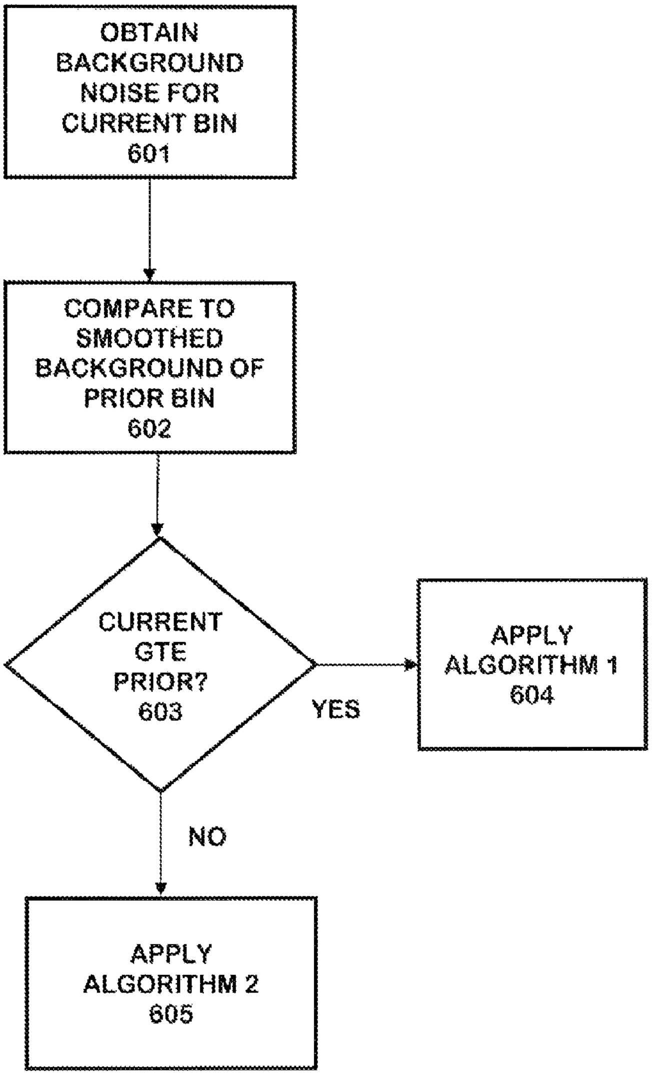
FIG. 6 is a flow diagram illustrating the technique used by the system to estimate the smoothed background noise.

It can be seen that to deal with tonal noise, one method is to first identify the peaks of tonal noise. FIG. 6 is a flow diagram illustrating the technique used by the system to identify peaks in an input signal. The system transforms the time domain signal into frequency domain. The frequency resolution may vary from systems to systems. In some embodiments of the system, the frequency resolution for this part of the system is 43 Hz per bin. The input signal is analyzed at each of the frequency bins. At step 601 the background noise estimate for a current bin under consideration is obtained. At step 602, the current background noise estimate is compared to the smoothed background noise for the prior bin (the bin analyzed just prior to the current bin). At decision block 603 it is determined if the current background noise estimate is greater than or equal to the smoothed background noise of the prior bin. If yes, a first algorithm is applied at step 604. If no, a second algorithm is applied at step 605.

One method for implementing the technique of FIG. 6 is the application of an asymmetric IIR (infinite impulse response) filter to detect the location as well as magnitude of tonal noise peaks.

As noted at step 601, the background noise estimate $B_n(k)$ at n th frame and k th frequency bin is estimated. The smoothed background noise $\overline{B}_n(k)$ for this kth bin can be calculated by an asymmetric IIR filter. The background noise estimate $B_n(k)$ of the present bin is compared to the smoothed background noise $\overline{B}_n(k-1)$ of the prior bin (step 602). Depending on the results of the comparison, different-branches of the asymmetrical IIR filter are applied.

when $B_n(k) \geqq \overline{B}_n(k-1)$ (step 603 is true) the following is applied.

$$\overline{B}_n(k)=\beta_1 * B_n(k)+(1-\beta_1)*\overline{B}_n(k-1) \text{(step 604)}$$

when $B_n(k) < \overline{B}_n(k-1)$ (step 603 is false) then apply:

$$\overline{B}_n(k)=\beta_2 * B_n(k)+(1-\beta_2)*\overline{B}_n(k-1) \text{(step 605)}$$

Here $\beta_1$ and $\beta_2$ are two parameters in the range from 0 to 1. They are used to adjust the rise and fall adaptation speed. By choosing $\beta_2$ to be greater than or equal to $\beta_1$, the smoothed background noise follows closely to the noise estimation except at the places where there are tonal peaks. The smoothed background can then be used to remove tonal noise in the next step. Note that the same filter can be run through the noise spectrum in forward or reverse direction, and also for multiple passes as desired.

Identifying Tonal Noise Peaks

Figure 7:
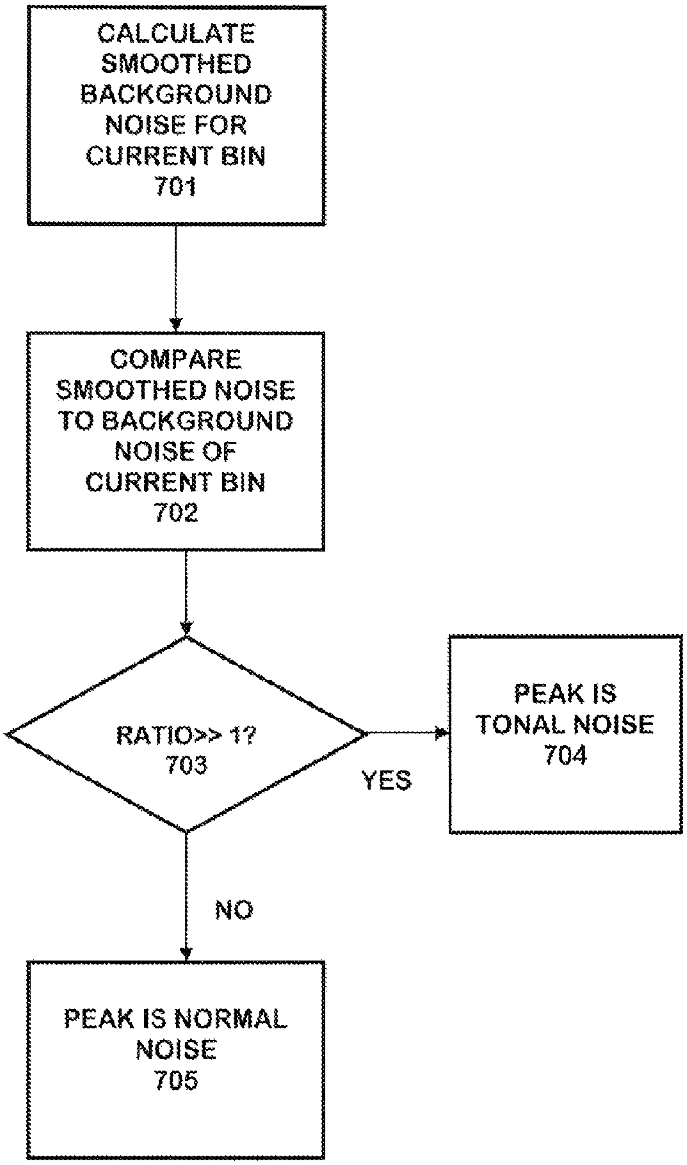
FIG. 7 is a flow diagram illustrating a technique for determining the presence of tonal peaks.

FIG. 7 is a flow diagram illustrating a ratio technique for determining the presence of tonal peaks. At step 701 the smoothed background noise for the current bin is calculated. (This can be done as described in FIG. 6). At step 702 the smoothed background noise of the current bin is compared to the background noise estimate of the current bin. At decision block 703 it is determined if the ratio is much greater than 1. If so, it is presumed that the peak at that bin is a tonal peak at step 704. If not, the peak at that bin is presumed to be normal noise at step 705.

One method for implementing the technique of FIG. 7 is described here. The ratio between non-smoothed ($B_n(k)$) and smoothed ($\overline{B}_n(k)$) (step 701) background noise is given by:

$$\xi_n(k)=B_n(k)/\overline{B}_n(k) \text{(Step 702).}$$

The value of $\xi_n(k)$ is normally around 1 (step 703 is false) meaning the non-smoothed background noise is approximately equal to the smoothed background noise and is thus normal noise (step 705). However when there is tonal noise in the background, large values of $\xi_n(k)$ are found (step 703 is true) at different frequencies. Therefore a large $\xi_n(k)$ is used as an indicator of tonal noise (step 704).

The system tracks which bins have noise due to tonal effects and which bins have noise considered to bet normal noise.

Methods to Remove Tonal Noise

Non-Adaptive

Figure 8:
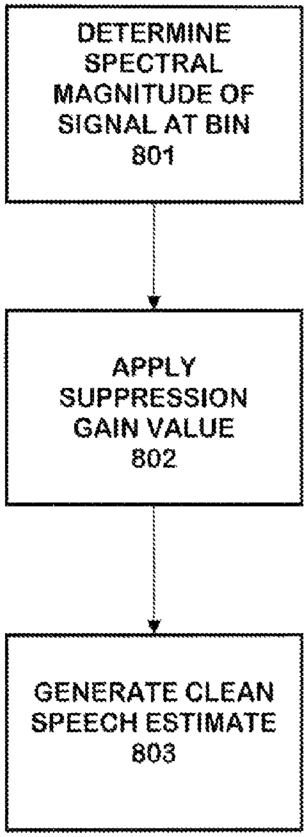
FIG. 8 is a flow diagram illustrating prior art technique for estimating a clean speech signal.

Once the peaks that require processing have been determined, corrective action can be taken. FIG. 8 is a flow diagram illustrating a non-adaptive technique for estimating a clean speech signal. At step 801 the spectral magnitude of the noisy speech signal at the current bin is determined. At step 802 a suppression gain value is applied to the spectral magnitude. At step 803 an estimate of clean speech spectral magnitude is generated.

The system of FIG. 8 can be implemented as follows. In a classical additive noise model, noisy speech is given by $$y(t)=x(t)+d(t)$$

Where x(t) and d(t) denote the speech and the noise signal, respectively.

Let $|Y_{n,k}|$, $|X_{n,k}|$, and $|D_{n,k}|$ designate the short-time spectral magnitude of noisy speech, speech and noise, respectively, at n th frame and k th frequency bin. The noisy speech spectral magnitude can be known (step 801), but the actual values of the noise and clean speech are not known. To obtain a cleaned up speech signal requires manipulation of the noisy speech spectral magnitude. The noise reduction process consists in the application (step 802) of a spectral gain value $G_{n,k}$ to each short-time spectrum value. An estimate of the clean speech spectral-magnitude can be obtained (step 803) as:

$$|\hat{X}_{n,k}|=G_{n,k}\cdot|Y_{n,k}|$$

Where $G_{n,k}$ is the spectral suppression gain. Various methods have been introduced in the literatures on how to calculate this gain. Examples include the decision-directed approach proposed in Ephraim, Y.; Malah, D.; Speech Enhancement Using A Minimum-Mean Square Error Short-Time Spectral Amplitude Estimator, *IEEE Trans. on Acoustics, Speech, and Signal Processing* Volume 32, Issue 6, December 1984 Pages: 1109-1121.

Musical Tone Noise

One problem with the spectral suppression methods is the possible presence of musical tone noise. In order to eliminate or mask the music noise, the suppression gain should be floored:

$$G_{n,k}=\max(\sigma,G_{n,k})$$

Here σ is a constant which has the value between 0 and 1.

Figure 3:
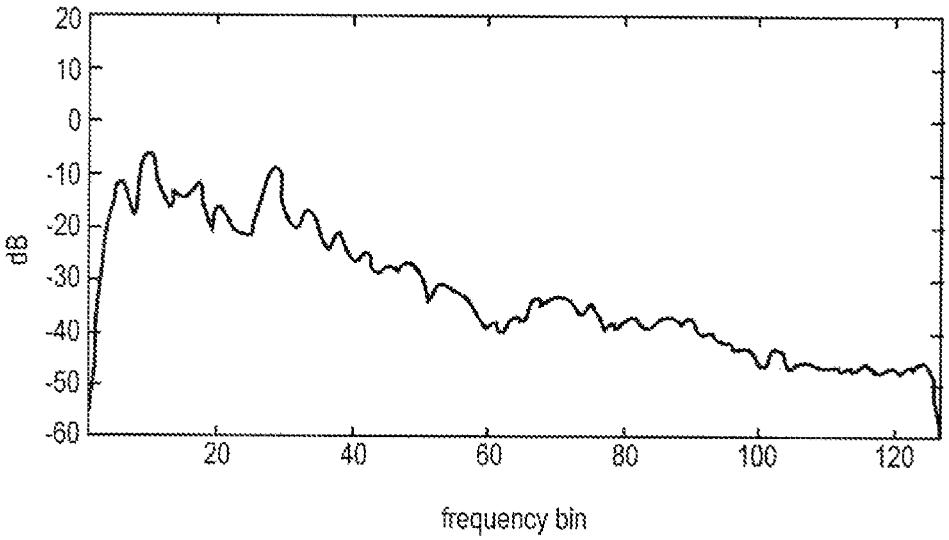
FIG. 3 the PSD of the tonal noise after prior art noise reduction.

Noise reduction methods based on the above spectral gain have good performance for normal car noise. However when there is tonal noise at the background, these methods can only suppress the tonal noise but can not eliminate it. Referring now to FIG. 3, the PSD of a signal after prior art noise reduction is shown. The signal still has peaks at the frequencies where tonal noise is present. Thus, the overall signal is suppressed, but the tonal noise remains.

Adaptive Method

Figure 9:
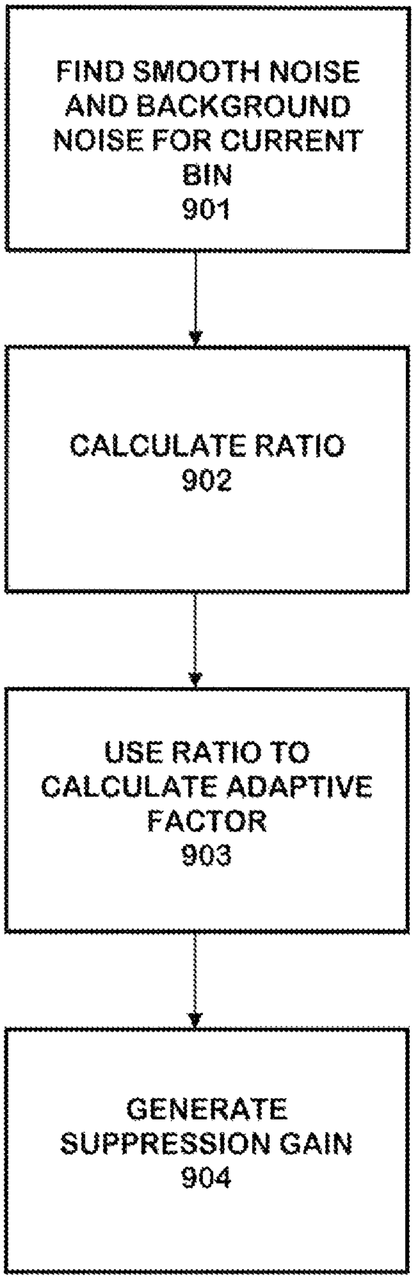
FIG. 9 is a flow diagram illustrating the use of an adaptive factor to calculate a suppression gain value.

In order to remove tonal noise, instead of using a constant floor σ, the system uses a variable floor that is specified at each frequency bin. FIG. 9 is a flow-diagram illustrating the use of an adaptive factor to calculate a suppression gain value. At step 901 the smoothed background noise and the background noise estimate values are determined for a current frequency bin.

At step 902 the smoothed background value and background noise estimate value are used to generate a ratio. This ratio is used at step 903 to calculate the value for the adaptive factor to be used for the current bin. At step 904 the adaptive factor is used to generate the suppression gain value for the current bin. In this manner each frequency bin has a changing suppression gain floor that is dependent on the values of the ratio at that bin. The operation of the system of Figure is described as follows:

At a frequency bin estimate the background noise $B_n(k)$ and calculate the smoothed background noise $\overline{B}_n(k)$ (step 901). The techniques above may be used to generate the values. At step 902 calculate the ratio $\xi_n(k)$ as described above. This can then be used at step 903 to generate an adaptive factor σ that is related to the current frequency bin. The adaptive factor is defined by:

$$\sigma_{n,k}=\sigma\cdot\xi_n(k)$$

The tonal noise suppression gain to be applied to the signal (step 904) is then given by:

$$\hat{G}_{n,k}=\max(\sigma_{n,k},G_{n,k})$$

Random Technique

Applying the above adaptive suppression gain to the spectral magnitude can achieve improved tonal noise removal. However, when there are severe tonal noises in the background, using the original noisy phase may make the tonal sound still audible in the processed signal. For, further smoothing, an alternate technique is to replace the original phases by random phases in the frequency bins whenever the adaptive suppression gain applied to the original noisy signal is less than the smoothed background noise.

Figure 10:
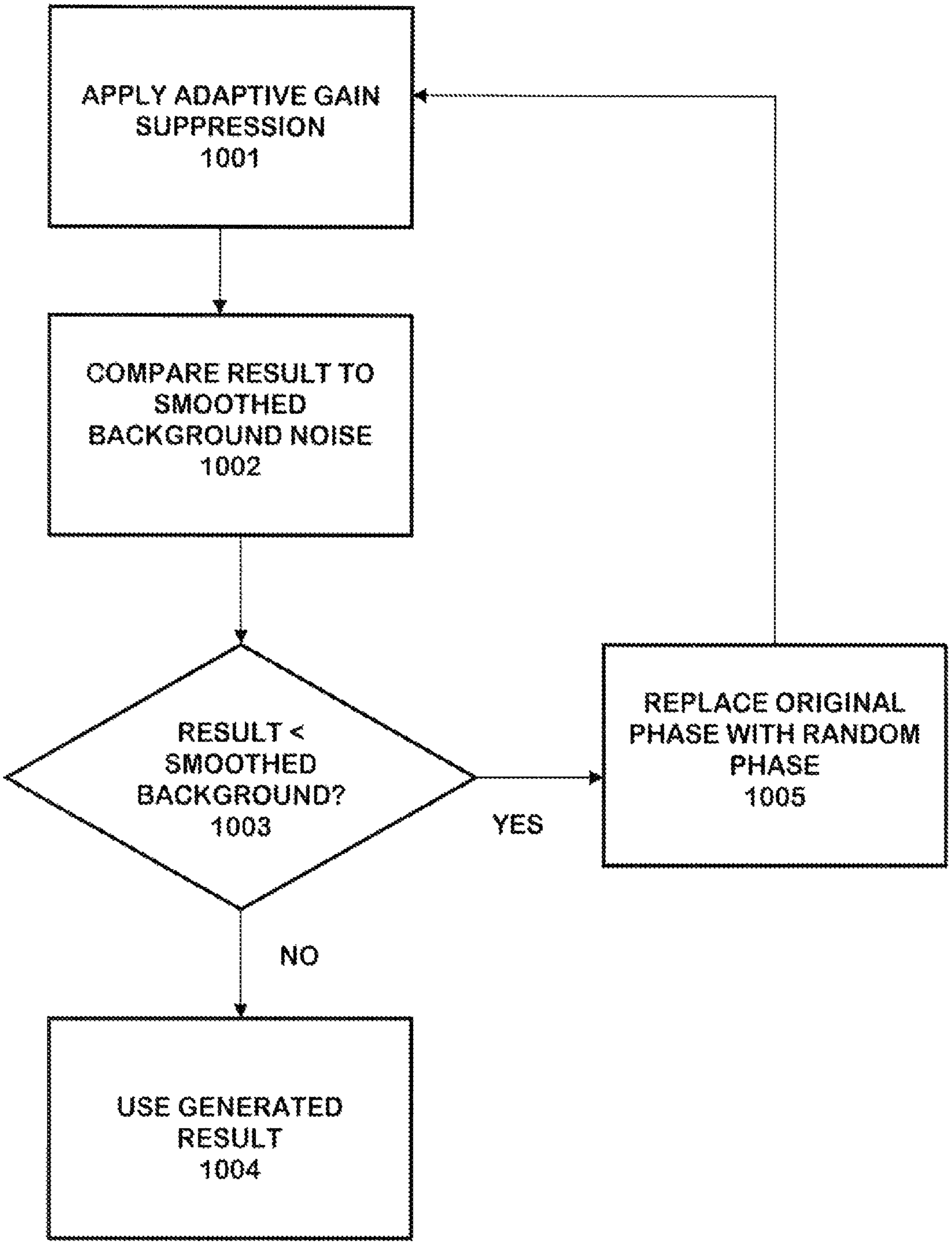
FIG. 10. is a flow diagram illustrating a suppression technique using random phases.

FIG. 10 is a flow diagram illustrating a suppression technique using random phases. At step 1001 apply the adaptive gain suppression technique of FIG. 9. At step 1002 compare the result (multiplied by the noisy signal) to the smoothed background noise value for the current frequency bin. At decision block 1003 determine if the result is less than the smoothed background noise value. If no, the generated result can be used. If the result is less than the smoothed background noise then at step 1005 replace the original phase with a random phase. Step 1002 and 1003 can be implemented as follows:

$$\text{If } \hat{G}_{n,k}\cdot|Y_{n,k}|<\overline{B}_n(k)$$

The estimate of the clean speech spectral magnitude can be obtained (step 1001) as:

$$|\hat{X}_{n,k}|=\hat{G}_{n,k}\cdot|Y_{n,k}|$$

The estimate of the complex clean speech is given by:

$$\hat{X}_{n,k}=|\hat{X}_{n,k}|\cdot(R_{n,k}+I_{n,k}\cdot j)$$

Here $R_{n,k}$, $I_{n,k}$ are two Gaussian random numbers with zero mean and unit variance.

Figure 4:
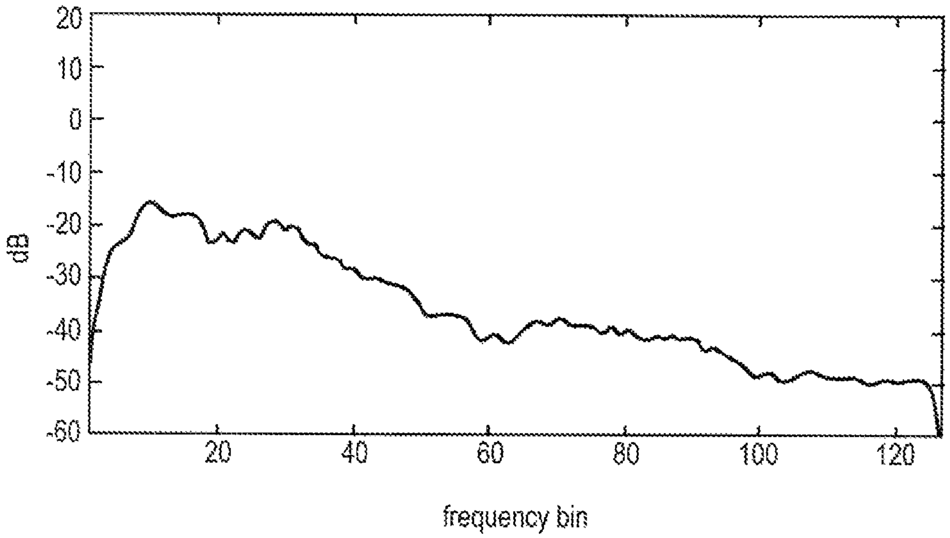
FIG. 4 illustrates the PSD of the tonal noise, processed by the disclosed tonal noise reduction method.

FIG. 4 illustrates the PSD of the tonal noise processed by the disclosed tonal noise reduction method. As can be seen, the resulting waveform has fewer peaks and a more smooth profile.

The illustrations have been discussed with reference to functional blocks identified as modules and components that are, not intended to represent discrete structures and may be combined or further sub-divided. In addition, while various embodiments of the invention have been described, it will be apparent to those of ordinary skill in the art that other embodiments and implementations are possible that are within the scope of this invention. Accordingly, the invention is not restricted except in light of the attached claims and their equivalents.

What is claimed is:

1. A method of identifying tonal noise comprising:

transforming an input signal into a plurality of frequency bins;

at each bin calculating a smoothed background noise and a background noise estimate;

at each bin comparing the smoothed background noise to the background noise estimate;

calculating a ratio of the background noise estimate to the smoothed background noise for a bin;

comparing the ratio to a predetermined threshold value;

identifying whether a peak in the bin is a tonal peak or a non-tonal noise peak based on the comparison between the ratio and the predetermined threshold value;

identifying the bin as having the tonal peak in response to a determination that the ratio of the background noise estimate to the smoothed background noise is greater than the predetermined threshold value; and attenuating at least a portion of the tonal peak of the input signal to generate an output signal with reduced tonal noise.

2. The method of claim 1 where the step of comparing comprises comparing the smoothed background noise to the background noise estimate of the same bin.

3. The method of claim 1 where the threshold value is greater than 1.

4. The method of claim 2 wherein the step of determining a smoothed background noise for a current frame n is accomplished by $$\overline{B}_n(k)=\beta_1*B_n(k)+(1-\beta_1)*\overline{B}_n(k-1)$$

when $B_n(k)\geqq\overline{B}_n(k-1)$ where $B_n(k)$ is the background noise estimate of the present frame n at frequency bin k and $\overline{B}_n(k-1)$ is the smoothed background noise of the prior bin k−1.

5. The method of claim 4 wherein the step of determining a smoothed background noise is given by $$\overline{B}_n(k)=\beta_2*B_n(k)+(1-\beta_2)*\overline{B}_n(k-1)$$

when $B_n(k)<\overline{B}_n(k-1)$.

6. The method of claim 1 wherein the ratio $\xi_n(k)$ is given by $$\xi_n(k)=B_n(k)/\overline{B}_n(k).$$

7. A method of removing tonal noise from a signal comprising:

determining a short-time spectral magnitude $|Y_{n,k}|$ of a noisy speech signal at an nth frame and kth frequency bin;

calculating a background noise estimate of the noisy speech signal at the kth frequency bin;

calculating a smoothed background noise of the noisy speech signal at the kth frequency bin;

calculating a ratio of the background noise estimate and the smoothed background noise;

calculating an adaptive suppression gain value $\hat{G}_{n,k}$ based on the ratio of the background noise estimate and the smoothed background noise; and attenuating at least a portion of a tonal noise in the noisy speech signal to generate an estimated clean speech signal $|\hat{X}_{n,k}|$ by $|\hat{X}_{n,k}|=\hat{G}_{n,k}|Y_{n,k}|$.

8. The method of claim 7 wherein $\hat{G}_{n,k}$ is generated by $$\hat{G}_{n,k}=\max(\sigma_{n,k},G_{n,k})$$

where $\sigma_{n,k}$ is an adaptive gain factor related to a current frequency bin.

9. The method of claim 8 where $\sigma_{n,k}$ is generated by $$\sigma_{n,k}=\sigma\cdot\xi_n(k)$$

where σ is a constant factor and $\xi_n(k)$ is the ratio between the background noise estimate and the smoothed background noise at bin k.

10. The method of claim 9 where $$\xi_n(k)=B_n(k)/\overline{B}_n(k)$$

where $B_n(k)$ is the background noise estimate of the current frame n at frequency k and $\overline{B}_n(k)$ is the smoothed background noise of the same bin.

11. The method of claim 10 further including the step of comparing $\hat{G}_n(k)\cdot|Y_n(k)|$ to $\overline{B}_n(k)$.

12. The-method of claim 11 further including the step of accepting $|\hat{X}_{n,k}|$ when $\hat{G}_n(k)\cdot|Y_n(k)\geqq\overline{B}_n(k)$.

13. The method of claim 11 further including the step of replacing the original phase with a random phase when $\hat{G}_{n,k}\cdot|Y_{n,k}|<\overline{B}_n(k)$.

14. The method of claim 1 where the input signal comprises an audio signal with speech content and tonal noise content.

15. The method of claim 1 where the input signal comprises an audio signal with tonal noise content and diffuse noise content, and where the step of attenuating comprises attenuating the tonal peak associated with the tonal noise content by a greater amount than the diffuse noise content.

16. The method of claim 1 where the step of calculating the smoothed background noise comprises calculating the smoothed background noise by an asymmetric infinite impulse response filter.

17. The method of claim 5 where βhd 1 and $\beta_2$ are two parameters in a range from 0 to 1, and where $\beta_2$ is greater than $\beta_1$.

18. A method of attenuating tonal noise comprising:

determining a short-time spectral magnitude $|Y_{n,k}|$ of an audio input signal;

transforming the input signal into a plurality of frequency bins;

calculating a background noise estimate of the input signal at a first bin of the plurality of frequency bins;

calculating a smoothed background noise of the input signal at the first bin;

calculating a ratio of the background noise estimate and the smoothed background noise;

comparing the ratio to a predetermined threshold value;

identifying whether a peak in the first bin is a tonal noise peak or a non-tonal noise peak in response to the comparison between the ratio and the predetermined threshold value;

identifying the first bin as having the tonal noise peak in response to a determination that the comparison meets a predetermined condition;

calculating an adaptive suppression gain value $\hat{G}_{n,k}$ based on the ratio; and attenuating at least a portion of the tonal noise peak of the input signal to generate an audio output signal $|\hat{X}_{n,k}|$ with reduced tonal noise by $|\hat{X}_{n,k}|=\hat{G}_{n,k}|Y_{n,k}|$.

19. The method of claim 7 wherein the step of calculating the adaptive suppression gain value $\hat{G}_{n,k}$ comprises changing a suppression gain floor associated with the adaptive suppression gain value $\hat{G}_{n,k}$ that is dependent on the ratio of the background noise estimate and the smoothed background noise.

* * * * *